United States Patent
Strahan et al.

(10) Patent No.: US 7,741,964 B2
(45) Date of Patent: Jun. 22, 2010

(54) TIRE PRESSURE DETECTOR HAVING REDUCED POWER CONSUMPTION MECHANISM

(75) Inventors: Samuel Kane Strahan, Ballymena Co. (GB); Neil Bilcliff, Oxfordshire (GB); Emmanuel Marguet, Arcon (FR); Nicolas Henriet, Arcon (FR)

(73) Assignee: Schrader Electronics Ltd., Antrim N.I. (GB)

( * ) Notice: Subject to any disclaimer, the term of this patent is extended or adjusted under 35 U.S.C. 154(b) by 287 days.

(21) Appl. No.: 11/809,241

(22) Filed: May 31, 2007

(65) Prior Publication Data

US 2008/0297337 A1 Dec. 4, 2008

(51) Int. Cl.
*B60C 23/00* (2006.01)

(52) U.S. Cl. ..................... 340/442; 340/447

(58) Field of Classification Search ............. 340/442, 340/445, 446, 447, 448, 539.1, 539.3, 10.41, 340/539.21, 10.4; 375/295, 361; 73/146.4, 73/146.5; 455/569.2
See application file for complete search history.

(56) References Cited

U.S. PATENT DOCUMENTS

| | | | |
|---|---|---|---|
| 5,040,561 A | 8/1991 | Achterholt | 137/227 |
| 5,040,562 A | 8/1991 | Achterholt | 137/227 |
| 5,825,286 A | 10/1998 | Coulthard | 340/447 |
| 6,246,317 B1 | 6/2001 | Pickornik et al. | 340/447 |
| 6,271,748 B1 | 8/2001 | Derbyshire et al. | 340/442 |
| 6,609,419 B1 * | 8/2003 | Bankart et al. | 73/146.5 |
| 6,667,687 B1 | 12/2003 | DeZorzi | 340/447 |
| 6,950,009 B1 * | 9/2005 | Nysen | 340/10.41 |
| 7,133,482 B2 * | 11/2006 | Poletto et al. | 375/361 |
| 7,376,448 B2 * | 5/2008 | Watabe | 455/569.2 |
| 7,424,064 B2 * | 9/2008 | Shakeshaft et al. | 375/295 |
| 7,474,208 B1 * | 1/2009 | Klein | 340/539.21 |
| 2002/0044050 A1 | 4/2002 | Derbyshire et al. | 340/442 |
| 2002/0075145 A1 | 6/2002 | Hardman et al. | 340/442 |
| 2007/0125161 A1 | 6/2007 | Bryzek et al. | 73/146.4 |
| 2007/0279832 A1 | 12/2007 | Ray et al. | 361/271 |

OTHER PUBLICATIONS

Atmel (Datasheet), UHF ASK/FSK Transmitter, ATA5756/ATA5757, No. 47021-RKE Dated Nov. 2005.
Atmel (Datasheet), TPMS Control and Transmitter IC, ATA6285/6286, No. 4968AS-Auto Dated Sep. 2006.
Notification of Transmittal of the International Search Report and the Written Opinion of the International Searching Authority, or the Declaration, Date of Mailing Sep. 19, 2008.

* cited by examiner

*Primary Examiner*—Van T. Trieu
(74) *Attorney, Agent, or Firm*—J. L. Mahurin, Esq.; J. A. Thurnau, Esq.; P. N. Dunlap, Esq.

(57) ABSTRACT

A tire pressure detector employs a reduced power consumption mechanism comprising a PLL circuit including a VCO, that is operated in response to the logic states of an input data stream and a power amplifier configured to be externally located to an integrated circuit. The input data stream includes tire pressure information and is configured to be encoded to have multiple logic states. A micro-controller is employed to control the VCO, turning the VCO, and/or the amplifier, on and off for a certain period, according to the pattern of each data bit of the input data stream thus providing reduced current consumption. This tire pressure detector thus embodies an optimized circuit arrangement in terms of power efficiency.

23 Claims, 4 Drawing Sheets

TIRE PRESSURE DETECTOR HAVING REDUCED POWER CONSUMPTION MECHANISM

BACKGROUND OF THE INVENTION

1. Field of the Invention

The present invention generally relates to a tire pressure detector, and in particular to tire pressure detectors employing a reduced power consumption mechanism.

2. Related Art

In a vehicle, a tire pressure detector may be used in conjunction with a Tire Pressure Monitoring System (TPMS) to measure air pressure in tires. Tires having low tire pressure may raise safety concerns. The tire pressure detector may be attached to a tire, or the wheel on which the tire is mounted, and may detect low tire pressure. Upon detection, the tire pressure detector may transmit this information to a driver via a TPMS or the like. The transmission of the tire pressure information is often performed wirelessly. For instance, a radio frequency transmission may be used to transmit tire pressure detector readings.

In a tire pressure detector, sensors in addition to a pressure sensor such as a temperature sensor and/or a speed sensor may be included. A battery is also typically used to power components of the tire pressure detector. The tire pressure detector may also include communication components such as a phase locked loop (PLL) circuit, a crystal oscillator, an RF antenna that sends radio transmissions to a central control unit and possibly receives radio transmissions, etc. A power amplifier may also be included such that tire pressure signals may be amplified for transmission.

In a conventional tire pressure detector, the PLL circuit and the power amplifier are often installed on a single integrated circuit (IC) chip. FIG. 1 is a block diagram of a conventional PLL circuit 10. The conventional PLL circuit 10 typically includes a phase detector 20, a voltage controlled oscillator (VCO) 30 and an amplifier 40, as one of ordinary skill in the art will appreciate. The PLL circuit 10 may be constructed as a single integrated circuit. Although not shown in FIG. 1, the power amplifier is typically disposed on the same IC chip that defines the PLL circuit 10.

The conventional PLL circuit 10 operates as follows. The phase detector 20 compares two input frequencies, "fin" and "fvco", and generates output that corresponds to a phase difference of the two input frequencies. If "fin" does not equal to "fvco", a phase-error signal is generated. The phase-error signal may be filtered by a suitable filter 50 and amplified by the amplifier 40. In response to the phase-error signal, "fvco" is deviated in the direction of "fin". If the "fin" does equal to "fvco", the VCO 30 will lock to "fin". The phases of the two input frequencies, "fin" and "fvco" become in phase.

In the conventional PLL circuit 10, the VCO 30 is always powered-on regardless of logic states of input data bits. Even if input data bits have a zero state, the VCO 30 remains on and consumes current. Further, various components on the IC chip may not be separately controllable. The PLL circuit 10 and a power amplifier formed on the single IC chip may also generate noise.

SUMMARY

The present invention is directed to systems and methods which provide tire pressure detectors employing a reduced power consumption mechanism. In embodiments of the present invention the tire pressure detector VCO employed may be powered in response to logic states of input data bits. For example, in accordance with the present invention, a tire pressure detector VCO may not be powered when input data bits have a zero state. Further, various components on a tire pressure detector IC chip may be separately controllable. Also, in accordance with embodiments of the present invention, the PLL circuit and a power amplifier for a tire pressure detector may not be formed on the same IC chip. This, in addition to other advantages, might reduce noise in transmissions from, and to, the tire pressure detector.

By way of example only, in some embodiments of the present invention, a tire pressure detector includes a pressure sensor, an integrated circuit, a power amplifier and a radio frequency (RF) antenna. The pressure sensor measures air pressure in a tire. The integrated circuit receives tire pressure information and processes the tire pressure information as an RF signal for transmission. The power amplifier receives the RF signal from the integrated circuit and amplifies the RF signal. The power amplifier is preferably configured to be externally disposed to the integrated circuit. The RF antenna is connected to the power amplifier and transmits the RF signal.

In other embodiments, a tire pressure detector includes a pressure sensor, a data processing circuit, a PLL circuit, and an RF antenna. Again, the pressure sensor measures pressure of a tire. The data processing circuit receives the tire pressure from the pressure sensor and generates an input data stream. The input data stream is preferably configured to be encoded to represent a first logic state and a second logic state. The data processing circuit modulates the input data stream for radio frequency transmission. The PLL circuit includes a VCO. In accordance with the present invention, the VCO may be configured to be powered on according to the first logic state and powered off according to the second logic state. Again, the RF antenna transmits the modulated input data stream.

In still other embodiments, a reduced power consumption mechanism of a tire pressure detector is provided. The tire pressure detector is configured to detect and process tire pressure information. The reduced power consumption mechanism includes an input data stream, a PLL circuit and a power amplifier. The input data stream includes tire pressure information and is configured to be encoded to have multiple logic states. The PLL circuit includes a voltage controlled oscillator that is operated in response to logic states of the input data stream. The PLL circuit is implemented in an integrated circuit. The power amplifier is preferably configured to be externally located to from the integrated circuit.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
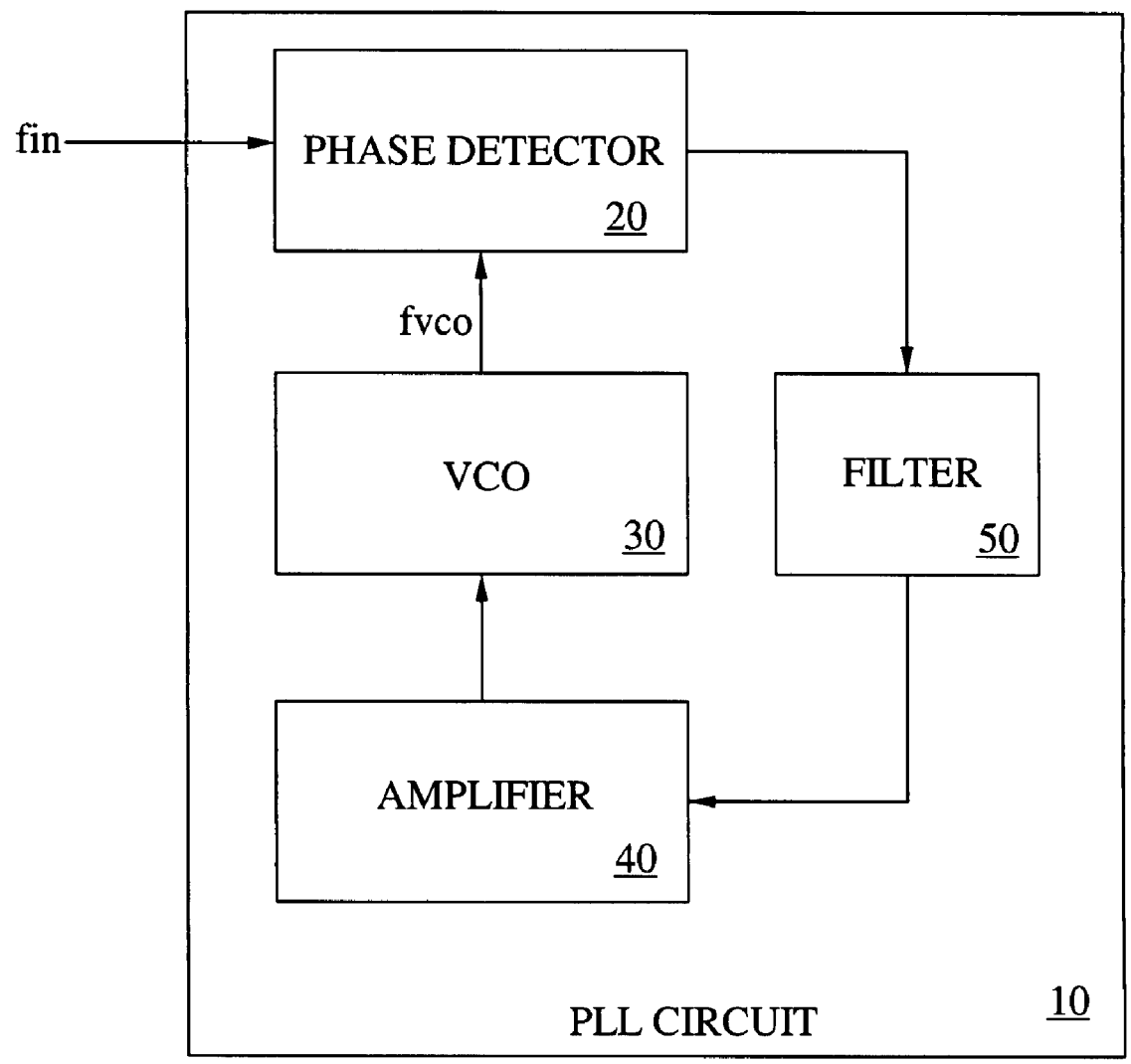
FIG. 1 is a block diagram of a conventional phase-locked loop circuit.
Figure 2:
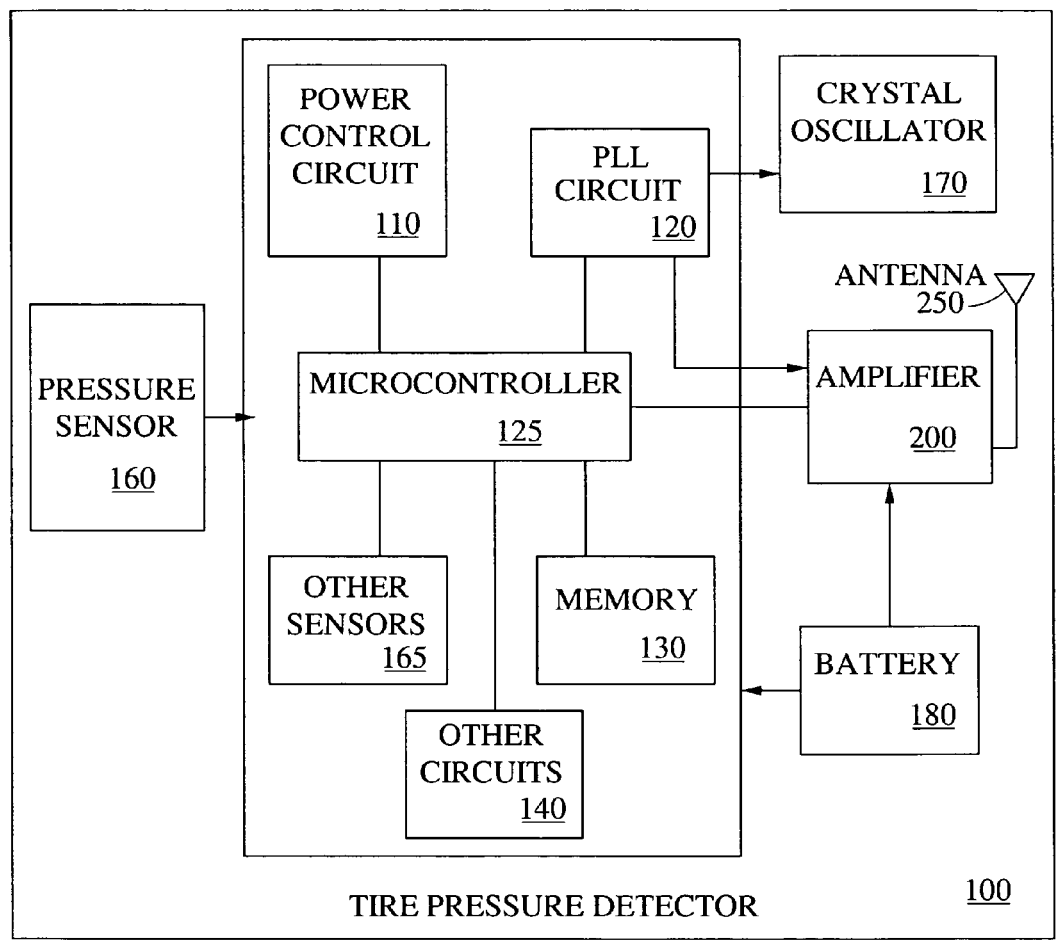
FIG. 2 is a block diagram of a tire pressure detector according to one embodiment.

FIG. 2 is a block diagram of an embodiment of tire pressure detector 100 of the present invention. Tire pressure detector embodiment 100 includes pressure sensor 160, main IC chip 150, crystal oscillator 170, battery 180, power amplifier 200, and RF antenna 250. Alternatively, detector 100 may be self-powered and not include a battery. Crystal oscillator 170, power amplifier 200 and battery 180 are connected to main IC chip 150. Power control circuit 110, phase-locked loop (PLL) circuit 120, microcontroller 125 and memory 130 are preferably formed on main chip IC 150. In this embodiment, crystal oscillator 170 is disposed off of main IC chip 150. In another embodiment, crystal oscillator 170 may be disposed on the main IC chip 150. Power amplifier 200 is preferably located off of main IC chip 150 in these embodiments.

Other sensors 165, detecting various physical parameters in a tire including tire temperature, speed, rotation, rotation direction, tilt, etc., may be included on main IC chip 150. For instance, other sensors 165 may include a temperature sensor, a speed sensor, an acceleration sensor, a shock sensor etc. Circuit block 140 indicates various other circuits that may be formed on the main IC chip 150 such as a timer, a low power detection circuit, a modulator, etc.

A tire pressure detector may be installed on each tire of a vehicle. Although not shown, a central control unit may be provided at a suitable location on a vehicle. The central control unit may be in communication with the tire pressure detectors and may inform a driver of various physical parameters of the tires including low tire pressures.

RF antenna 250 receives and sends information between a tire pressure detector 100 and other devices such as the central control unit. RF antenna 250 may be a planar RF antenna. Alternatively, RF antenna 250 may be a valve stem RF antenna. The valve stem RF antenna may use a tire valve as an RF antenna. For purposes of illustration only, RF antenna 250 is shown in the present Figures as internally formed within tire pressure detector 100.

Pressure sensor 160 measures or detects tire pressure. In illustrated tire pressure detector 100, pressure sensor 160 is a stand-alone sensor. In other embodiments, pressure sensor 160 may be integrated onto main IC chip 150. Pressure sensor 160 sends pressure information to the main IC chip 150 for processing. When other sensors 165 are included on main IC chip 150, physical parameter information detected by these sensors may be processed along with the pressure information from pressure sensor 160. The physical parameters information may be used to identify a mounting location of a tire sending the tire pressure information, or the like. Such information is transmitted to main IC chip 150 for processing. The tire pressure information, which may be in the form of raw data, with or without the physical parameters, becomes an input data stream to main IC chip 150. The input data stream may be manipulated internally and is preferably generated internally to main IC chip 150. The input data stream may be communicated to microcontroller 125 by main IC chip 150.

Preferably, microcontroller 125 controls various circuit elements on IC chip 150 to process the tire pressure information, such that the tire pressure information may be encoded. For instance, the tire pressure information may be encoded using the Manchester encoding technique. The Manchester encoding technique involves logic transition from high to low or low to high at half of the bit width of each bit. The logic transition from high to low corresponds to logic 1 and the logic transition from low to high corresponds to logic 0. Further, the tire pressure information may be formatted and patterned to be associated with an identification of a tire, a vehicle, etc. Additionally, the tire pressure information may be encrypted.

Figure 3:
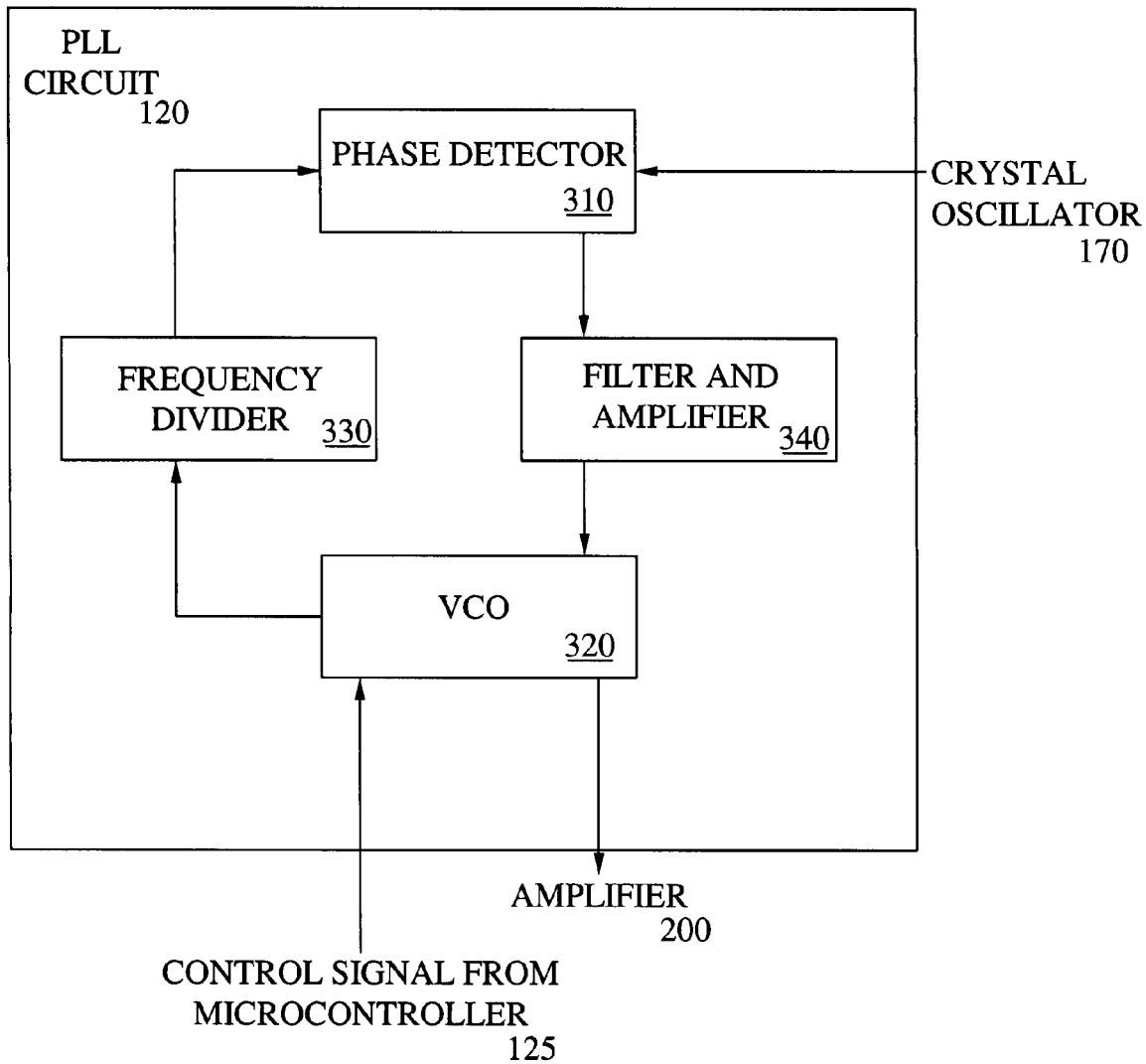
FIG. 3 is a block diagram of a PLL circuit for use with the tire pressure detector of FIG. 2.

Microcontroller 125 might also control a modulator, such as contained in other circuit block 140, to modulate an RF carrier frequency with tire pressure information for RF transmission. In one embodiment, the input data stream of the tire pressure information may be used to modulate an RF carrier frequency of 433.92 MHz while in another embodiment an RF carrier frequency such as 315 MHz may be used. Preferably, the RF carrier frequency is generated by VCO 320 included in PLL circuit 120, as shown in FIG. 3. The input data stream preferably has a predetermined data rate, such as 4 KHz, which is generated internally to main IC Chip 150.

Further, microcontroller 125 preferably controls and supervises the circuit elements formed on main IC chip 150. The tire pressure information and other physical parameter information from other sensors 165 may be stored in memory 130. Power control circuit 110 may distribute power from battery 180 or other power supply to circuit elements on main IC chip 150.

FIG. 3 is a block diagram of an embodiment of present PLL circuit 120. PLL circuit 120 includes phase detector 310, VCO 320, frequency divider 330 and filter and amplifier 340. PLL circuit 120 is in communication with crystal oscillator 170 and power amplifier 200. Phase detector 310 presently receives two input frequencies, one from crystal oscillator 170 and one from VCO 320 through frequency divider 330. Crystal oscillator 170 generates an input reference frequency. Phase detector 310 generates a phase-error signal if the phases of the two input frequencies do not equal. Filter and amplifier 340 operates to filter and amplify the phase-error signal. The frequency of VCO 320 is caused to be deviated toward the input frequency from crystal oscillator 170. Frequency divider 330 is placed between phase detector 310 and the output of VCO 320. The frequency divider operates such that a multiple of the input reference frequency is generated.

As shown in FIG. 3, VCO 320 receives a control signal from microcontroller 125. The control signal may cause VCO 320 to turn on and turn off at the transition of each data bit. As described above, the input data stream of the tire pressure information may be encoded according to the Manchester encoding. Each data bit experiences the logic transition at half of the bit width. The input data stream of the tire pressure information is generated internally to tire pressure detector 100. Formats and patterns of this data stream may already be known to microcontroller 125. Thus, microcontroller 125 may control VCO 320 to be turned on and off according to the transition of the input data stream.

VCO 320 and the PLL circuit 120 are preferably implemented for use with a particular input data stream configuration. On the other hand, PLL circuits which are generic with regard to input data encoding format and data rates may not operate or be operated to turn on and off voltage controller oscillators. Turning on and off VCO 320 may substantially reduce current consumption. For example, at each transition from logic 1 to logic 0 in the input data stream VCO 320 is preferably turned off. Before each transition from logic 0 to logic 1 in the input data stream the VCO is preferably turned on. In prior PLL designs the VCO typically remains on for periods of logic 0 in the input data stream. In accordance with embodiments of this invention for periods of logic 0 in the input data stream the VCO 320 is preferably switched off. This may lead to a reduction in current consumption by removing the current which the VCO consumes when powered on. Manchester encoding, as described above is a method of encoding which utilizes a logic state change at half of the bit width of a bit. Thus, VCO current consumption may be reduced by up to 50% in embodiments of the present invention compared to current used when the VCO remains on in conventional tire pressure detectors.

Referring back to FIG. 2, power amplifier 200 is preferably configured to be external to main IC chip 150. Because power amplifier 200 is external, any type of an amplifier may be used. For instance, amplifiers such as Class A type amplifiers or Class B type amplifiers may be used. Additionally, Class C type amplifiers are available. Class A type or Class B type amplifiers may provide good linearity of input signal and output signal but may have relatively poor power efficiency. In conventional tire pressure detectors, Class A and B type amplifiers are not typically used due to the relatively poor power efficiency, despite other advantages.

Embodiments of the present tire pressure detector 100 may employ Class A type and Class B type power amplifiers due to tire pressure detector 100 using current consumption reduction mechanisms such as PLL circuit 120 in conjunction with external amplifier 200 as described above. It is noted that power amplifier 200, being separated from IC chip 150, may not be affected by activation or operation of other circuit elements on the main IC chip 150. For instance, attempting to define the power amplifier 200 along with PLL circuit 120 on a single IC chip may be problematic, may produce more noise and may tend to consume more current. Further, deploying power amplifier 200 off the main IC chip 150 may provide more space for configuring and designing main IC chip 150.

Because power amplifier 200 is external to main IC chip 150, selection and replacement of power amplifier 200 may be flexible. A power amplifier that consumes a relatively high current, may be replaced with a lower current amplifier. Alternatively, or additionally, a power amplifier with relatively poor power efficiency may be replaced with an amplifier having better power efficiency. In accordance with the present invention, the power amplifier 200 is preferably selected to accommodate the most efficient power transfer between main IC chip 150 and RF antenna 250.

Like VCO 320 of FIG. 3, power amplifier 200 may be turned on and off according to the input data stream. For logic 1, power amplifier 200 is turned on and for logic 0, power amplifier 200 is turned off. Thus, operation of power amplifier 200 in accordance with embodiments of the present invention may allow the power amplifier 200 to be activated only when needed. As a result, current consumption by power amplifier 200 may be reduced.

Figure 4:
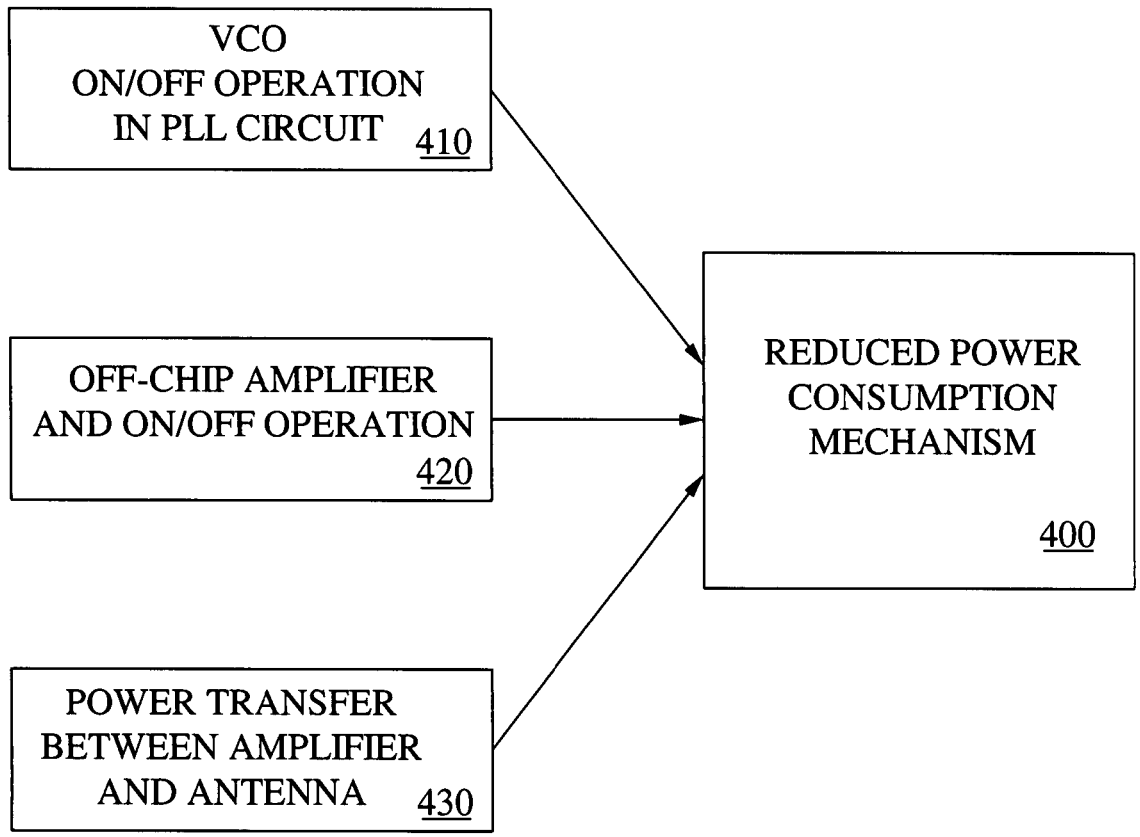
FIG. 4 is a block diagram illustrating a reduced power consumption mechanism.

FIG. 4 is a block diagram illustrating reduced power consumption mechanism 400 of tire pressure detector 100. Mechanism 400 may include VCO on/off operation in PLL circuit 410, an off-chip power amplifier and its on/off operation 420, and optimized power transfer between the off-chip power amplifier and RF antenna 430. As noted above, the on/off operation of the VCO and the power amplifier according to a pattern of each data bit may substantially minimize current consumption. Use of an off-chip power amplifier may provide advantages for selecting power efficient amplifiers when designing a tire pressure detector, or the like. For example, off-chip power amplifiers may be selected with consideration for efficient power transfer with the RF antenna. This flexibility further may contribute to reduced power consumption.

As noted above, tire pressure detectors may employ a current consumption reduction mechanism such as mechanism 400 of FIG. 4. The VCO of the PLL may be controlled to be turned off for a certain period according to the pattern of each data bit. Further, the off-chip power amplifier may provide reduced current consumption. Moreover, the off-chip power amplifier may provide advantages including flexibility in selecting power amplifiers and easy replacement. The power amplifier also may be separately controllable. More efficient power transfer between the power amplifier and the RF antenna is possible because the power amplifier may be selected to match specifications and functions of the RF antenna. The off-chip power amplifier may provide flexible configuration and implementation of the IC chip and the entire tire pressure detector. Accordingly, the tire pressure detector may embody an optimized circuit arrangement in terms of power efficiency and reduced production expenses.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A tire pressure detector, comprising:
a pressure sensor that measures pressure of a tire;
a data processing circuit that receives the tire pressure from said pressure sensor and generates an input data stream, said input data stream configured to be encoded to represent a first logic state and a second logic state, wherein said data processing circuit modulates said input data stream for radio frequency transmission;
a phase-locked loop circuit that includes a voltage controlled oscillator, said voltage controlled oscillator configured to be powered on according to said first logic state and powered off according to said second logic state; and
an RF antenna transmitting the modulated input data stream.

2. The tire pressure detector of claim 1, further comprising a power amplifier disposed between said phase-locked loop circuit and said RF antenna, wherein said power amplifier is powered on according to said first logic state and powered off according to said second logic state.

3. The tire pressure detector of claim 2, wherein said data processing circuit and said phase-locked loop circuit are implemented with an integrated circuit and said power amplifier is external to said integrated circuit.

4. The tire pressure detector of claim 2, wherein said power amplifier comprises one of a Class A type amplifier and a Class B type amplifier.

5. The tire pressure detector of claim 1, wherein said input data stream is encoded to experience transition from high to low or from low to high at half of a bit width of each data bit.

6. The tire pressure detector of claim 1, wherein said voltage controlled oscillator is powered off when said input data stream transitions from high to low and powered on when said input data stream transitions from low to high.

7. A tire pressure detector, comprising:
a pressure sensor that measures pressure in a tire;
an integrated circuit that receives tire pressure information from said pressure sensor and processes it as an RF signal for transmission, said integrated circuit comprising a phase-locked loop circuit formed on said integrated circuit said phase-locked loop circuit comprising a voltage controlled oscillator, said voltage controlled oscillator turned off when said input data stream transitions from high to low and turned on when said input data stream transitions low to high;
a power amplifier that receives said RF signal from said integrated circuit and amplifies said RF signal, said power amplifier configured to be externally disposed to said integrated circuit; and
an RF antenna connected to said power amplifier and transmitting said RF signal.

8. The tire pressure detector of claim 7 wherein said power amplifier operates to be turned on and turned off according to said pattern of said input data stream of said integrated circuit.

9. The tire pressure detector of claim 7, wherein said input data stream is encoded to experience transition from high to low or from low to high at half of a bit width of each data bit.

10. The tire pressure detector of claim 7, wherein said power amplifier comprises one of a Class A type amplifier and a Class B type amplifier.

11. A reduced power consumption mechanism of a tire pressure detector, wherein said tire pressure detector is configured to detect and process tire pressure information, said mechanism comprising:
an input data stream including said tire pressure information and configured to be encoded to have multiple logic states; and
a phase-locked loop circuit including a voltage controlled oscillator that is operated in response to the logic states of said input data stream, wherein said phase-locked loop circuit is implemented with an integrated circuit.

12. The reduced power consumption mechanism of claim 11 wherein said voltage controlled oscillator operates to be turned on and turned off according to a pattern of said input data stream.

13. The reduced power consumption mechanism of claim 12, wherein said input data stream is encoded to experience transition from high to low or from low to high at half of a bit width of each data bit.

14. The reduced power consumption mechanism of claim 11, wherein said voltage controlled oscillator is powered off when said input data stream transitions from high to low and powered on when said input data stream transitions from low to high.

15. The reduced power consumption mechanism of claim 11, further comprising a power amplifier configured to be located external to said integrated circuit.

16. A method comprising:
collecting data at each tire of a plurality of tires of a vehicle representative of at least one tire characteristic;
generating an input data stream employing a data processing circuit at each respective tire, including data responsive to said data representative of said at least one tire characteristic;
encoding said input data stream to comprise a plurality of bits such that each bit of data may contain a plurality of logic states;
powering a voltage controlled oscillator included in a phase-locked loop circuit in response to said logic states within said data bits included in said input data stream;
presenting a signal representative of said input data stream using said voltage controlled oscillator to a power amplifier; and
transmitting said output signal from said power amplifier to a central control unit using additional circuitry contained in said tire pressure detector.

17. The method of claim 16 wherein said data comprises data indicative of pressure in said tire.

18. The method of claim 16, wherein said powering a voltage controlled oscillator comprises turning said voltage controlled oscillator on and off according to a pattern of said input data stream.

19. The method of claim 16, further comprising:
operating said power amplifier by turning said power amplifier on and off according to a pattern of said input data stream.

20. The method of claim 16, wherein said encoding comprises encoding said input data stream to experience a transition from high to low or from low to high at half of a bit width of each data bit to provide said plurality of bits such that each bit of data contains a plurality of logic states.

21. The method of claim 20, wherein said powering a voltage controlled oscillator comprises powering off said voltage controlled oscillator when said input data stream transitions from high to low and powering on said voltage controlled oscillator when said input data stream transitions from low to high.

22. The method of claim 16, further comprising:
operating said amplifier in response to said logic states within said data bits included in said input data stream.

23. The method of claim 16, further comprising:
locating said power amplifier external to said integrated circuit.

* * * * *